(12) United States Patent
Ji et al.

(10) Patent No.: US 12,259,271 B2
(45) Date of Patent: Mar. 25, 2025

(54) AUTOMATIC WEIGHING CALIBRATION METHOD, SYSTEM AND EXCAVATOR

(71) Applicant: SHANGHAI SANY HEAVY MACHINERY CO., LTD, Shanghai (CN)

(72) Inventors: Xuefeng Ji, Shanghai (CN); Chuangshuo Zeng, Shanghai (CN)

(73) Assignee: SHANGHAI SANY HEAVY MACHINERY CO., LTD, Shanghai (CN)

( * ) Notice: Subject to any disclaimer, the term of this patent is extended or adjusted under 35 U.S.C. 154(b) by 14 days.

(21) Appl. No.: 18/449,836

(22) Filed: Aug. 15, 2023

(65) Prior Publication Data
US 2023/0384146 A1      Nov. 30, 2023

Related U.S. Application Data

(63) Continuation of application No. PCT/CN2021/124373, filed on Oct. 18, 2021.

(30) Foreign Application Priority Data

Apr. 21, 2021   (CN) .......................... 202110432627.4

(51) Int. Cl.
  *G01G 23/01*    (2006.01)
  *E02F 9/24*     (2006.01)

(52) U.S. Cl.
  CPC ............... *G01G 23/01* (2013.01); *E02F 9/24* (2013.01)

(58) Field of Classification Search
  CPC ................................ G01G 23/01; E02F 9/24
  See application file for complete search history.

(56) References Cited

U.S. PATENT DOCUMENTS

| 5,509,293 A | * | 4/1996 | Karumanchi | .......... | G01G 19/10 |
| | | | | | 73/1.13 |
| 6,552,279 B1 | * | 4/2003 | Lueschow | .............. | G01G 19/10 |
| | | | | | 73/1.13 |

(Continued)

FOREIGN PATENT DOCUMENTS

| CN | 103900669 A | 7/2014 |
| CN | 107209044 A | 9/2017 |

(Continued)

OTHER PUBLICATIONS

First Office Action issued in counterpart Chinese Patent Application No. 202110432627.4, dated May 7, 2022.

(Continued)

*Primary Examiner* — Randy W Gibson
(74) *Attorney, Agent, or Firm* — Westbridge IP LLC

(57) ABSTRACT

An automatic weighting calibration method for an excavator includes: firstly, obtaining a reference data set of the excavator under no-load working state; the reference data set includes a plurality of reference data groups, and each reference data group includes geometry data of the excavator, pressure data of an oil cylinder, dynamic data and no-load weighing data; and then, calibrating a coefficient matrix of the weighing model to realize the automatic weighing calibration for the excavator based on the reference data set. The weighing model is configured to automatically weigh the excavator.

5 Claims, 3 Drawing Sheets

(56) References Cited

U.S. PATENT DOCUMENTS

| | | | | |
|---|---|---|---|---|
| 7,480,579 | B2* | 1/2009 | Lueschow | E02F 9/264 |
| | | | | 702/100 |
| 8,909,437 | B2* | 12/2014 | Zhu | E02F 3/435 |
| | | | | 701/87 |
| 9,200,432 | B1* | 12/2015 | Shatters | E02F 3/40 |
| 9,464,403 | B2* | 10/2016 | Shatters | G01G 23/01 |
| 11,669,077 | B2* | 6/2023 | Domori | G06N 20/00 |
| | | | | 700/97 |
| 2015/0354177 | A1 | 12/2015 | Shatters et al. | |

FOREIGN PATENT DOCUMENTS

| | | |
|---|---|---|
| CN | 111027153 A | 4/2020 |
| CN | 113124988 A | 7/2021 |

OTHER PUBLICATIONS

Grant Notification issued in counterpart Chinese Patent Application No. 202110432627.4, dated Jan. 5, 2023.
International Search Report and Written Opinion issued in corresponding PCT Application No. PCT/CN2021/124373, dated Jan. 24, 2022.
Second Office Action issued in counterpart Chinese Patent Application No. 202110432627.4, dated Jun. 28, 2022.
Third Office Action issued in counterpart Chinese Patent Application No. 202110432627.4, dated Sep. 5, 2022.

* cited by examiner

AUTOMATIC WEIGHING CALIBRATION METHOD, SYSTEM AND EXCAVATOR

CROSS-REFERENCE TO RELATED APPLICATIONS

The present application is a continuation application of International Application No. PCT/CN2021/124373, filed on Oct. 18, 2021, which claims priority to Chinese Patent Application No. 202110432627.4, filed on Apr. 21, 2021. The disclosures of the above-mentioned applications are incorporated herein by reference in their entireties.

TECHNICAL FIELD

The present application relates to the technical field of working machine, in particular to an automatic weighing calibration method and an automatic weighing calibration system for an excavator.

BACKGROUND

As a part of the intelligent auxiliary function of excavators, automatic weighing has been paid more and more attention. The automatic weighing functions of excavators of many excavator manufacturers are relatively complete.

At present, the automatic weighing function of excavators usually requires the user to manually perform weighing calibration every period of time to ensure the accuracy of the automatic weighing results.

However, since weighing calibration needs to be performed manually, it will increase the cost of weighing calibration, and may cause poor weighing calibration results due to human factors, thereby affecting the accuracy of automatic weighing results.

SUMMARY

The present application provides an automatic weighing calibration method and an automatic weighing calibration system for an excavator to solve the defects in the related art. The present application provides an automatic weighing calibration method for an excavator, including:
  obtaining a reference data set of the excavator under no-load working state; the reference data set includes a plurality of reference data groups, and each reference data group includes geometry data of the excavator, pressure data of a cylinder, dynamic data and no-load weighing data output by a weighing model; and
  calibrating a coefficient matrix of the weighing model to realize the automatic weighing calibration for the excavator based on the reference data set;
  the weighing model is configured to automatically weigh the excavator.

According to the automatic weighing calibration method for the excavator provided by the present application, before the calibrating the coefficient matrix of the weighing model to realize the automatic weighing calibration for the excavator based on the reference data set, the method further includes:
  filtering out abnormal reference data in the reference data set to obtain a normal reference data set corresponding to normal reference data;
  the calibrating the coefficient matrix of the weighing model to realize the automatic weighing calibration for the excavator based on the reference data set includes:
    calibrating the coefficient matrix of the weighing model to realize the automatic weighing calibration for the excavator based on the normal reference data set.

According to the automatic weighing calibration method for the excavator provided by the present application, the calibrating the coefficient matrix of the weighing model to realize the automatic weighing calibration for the excavator based on the reference data set includes:
  in response to that statistical data of the no-load weighing data in the reference data set satisfies a calibration condition, determining a calibrated coefficient matrix based on the geometric data of the excavator, the pressure data of the oil cylinder and the dynamic data in the reference data set.

According to the automatic weighing calibration method for the excavator provided by the present application, the determining the calibrated coefficient matrix based on the geometric data of the excavator, the pressure data of the oil cylinder and the dynamic data in the reference data set includes:
  configuring the coefficient matrix of the weighing model as a variable matrix; and performing a regression fitting on the no-load data corresponding to the no-load working state, the geometric data of the excavator in the reference data set, the pressure data of the oil cylinder and the dynamic data to obtain the calibrated coefficient matrix based on the weighing model.

According to the automatic weighing calibration method for the excavator provided by the present application, the geometric data of the excavator includes a position information and a size information of each movable part of the excavator;
  the position information of each movable part is determined based on an angle information of each movable part or a displacement information of the oil cylinder corresponding to each movable part.

According to the automatic weighing calibration method for the excavator provided by the present application, the pressure data of the oil cylinder includes a pressure value of a large chamber of a boom hydraulic cylinder and a pressure value of a small chamber of the boom hydraulic cylinder of the excavator.

According to the automatic weighing calibration method for the excavator provided by the present application, the dynamic data includes a speed information and an acceleration information of each movable part of the excavator.

The present application also provides an automatic weighing calibration system for an excavator, including:
  a data acquisition module, configured to obtain a reference data set of the excavator under no-load working state; the reference data set includes a plurality of reference data groups, and each reference data group includes geometry data of the excavator, pressure data of an oil cylinder, dynamic data and no-load weighing data output by a weighing model; and
  a calibration module, configured to calibrate a coefficient matrix of the weighing model to realize the automatic weighing calibration for the excavator based on the reference data set;
  the weighing model is configured to automatically weigh the excavator.

The present application also provides an excavator, including the automatic weighing calibration system for the excavator configured to perform automatic weighing calibration for the excavator.

The present application also provides an electronic device, including a memory, a processor, and a computer program stored on the memory and running on the processor; when the processor executes the program, the steps of the automatic weighing calibration method for the excavator are implemented.

The present application also provides a non-transitory computer-readable storage medium on which a computer program is stored; when the computer program is executed by a processor, the steps of the automatic weighing calibration method for the excavator are implemented.

In the automatic weighing calibration method and system for the excavator provided by the present application, first, the reference data set of the excavator is obtained under no-load working state; the reference data set includes a plurality of reference data groups, and each reference data group includes geometry data of the excavator, pressure data of the oil cylinder, dynamic data and no-load weighing data output by the weighing model; then, the coefficient matrix of the weighing model is calibrated to realize the automatic weighing calibration for the excavator based on the reference data set; the weighing model is configured to automatically weigh the excavator. In the process of weighing calibration, manual operation is not required, which reduces the cost of weighing calibration. Moreover, since no human error is introduced, the accuracy of weighing calibration can be improved, and the effect of weighing calibration can be improved. In addition, it has a good user experience since it does not require the user to calibrate regularly. Automatic calibration can also be performed for special situations such as the addition of bucket reinforcement plates by users.

BRIEF DESCRIPTION OF THE DRAWINGS

In order to more clearly illustrate the technical solutions in the present application or the related art, the accompanying drawings that need to be used in the description of the embodiments or the related art will be briefly introduced below. Obviously, the accompanying drawings in the following description are only some embodiments of the present application, and those skilled in the art can also obtain other drawings according to the structures shown in these drawings without creative effort.

DETAILED DESCRIPTION OF THE EMBODIMENTS

In order to make the purpose, technical solutions and advantages of the present application clearer, the technical solutions in the present application will be described clearly and completely below with reference to the accompanying drawings in the present application. Obviously, the described embodiments are part of the embodiments of the present application, not all embodiments. Based on the embodiments in the present application, all other embodiments obtained by those skilled in the art without creative work fall within the protection scope of the present application.

As for the current automatic weighing function of excavators, weighing calibration is usually performed manually, which will increase the cost of weighing calibration, and may lead to poor weighing calibration due to human factors, thereby affecting accuracy of the automatic weighing results. To this end, the embodiments of the present application provide an automatic weighing calibration method for an excavator.

Figure 1:
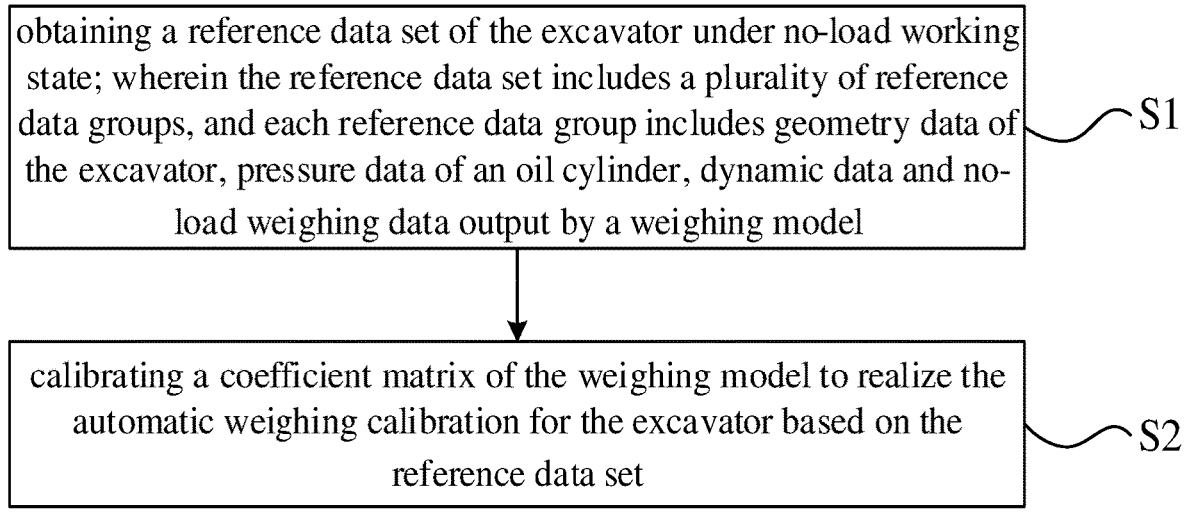
FIG. 1 is a first schematic flowchart of an automatic weighing calibration method for an excavator according to the present application.

FIG. 1 is a schematic flowchart of an automatic weighing calibration method for an excavator provided in an embodiment of the present application. As shown in FIG. 1, the method includes:

S1, obtaining a reference data set of the excavator under no-load working state; the reference data set includes a plurality of reference data groups, and each reference data group includes geometry data of the excavator, pressure data of an oil cylinder, dynamic data and no-load weighing data output by a weighing model; and S2, calibrating a coefficient matrix of the weighing model to realize the automatic weighing calibration for the excavator based on the reference data set.

The weighing model is configured to automatically weigh the excavator.

Specifically, in the automatic weighing calibration method for the excavator provided in the embodiments of the present application, the execution subject is an internal controller of the excavator, or a server. The server may be a local server or a cloud server. The local server may be a computer, a tablet computer, a smart phone, or the like, which is not specifically limited in this embodiment of the present application.

First, step S1 is performed to obtain a reference data set when the excavator is in a no-load working state. The no-load working state refers to the state in which there is no cargo in the bucket of the excavator, which can be determined by the sensors arranged in the bucket, or by the control commands in the cab received by the excavator controller, or by recognizing the posture of the excavator, which is not specifically limited in this embodiment of the present application. The reference data set includes a plurality of reference data groups, and the number of reference data groups is at least greater than or equal to a preset value. The preset value can be set according to the needs of calibration accuracy, which is not specifically limited in this embodiment of the present application. This is because the accuracy of the weighing calibration can only be guaranteed if the number of reference data groups is greater than or equal to the preset value. Each reference data group may include geometric data of the excavator under no-load working state, pressure data of the oil cylinder under no-load working state, dynamic data under no-load working state, and no-load weighing data under no-load working state, etc., and may also include other information, which is not specifically limited in this embodiment of the present application. The geometric data of the excavator is configured to characterize the geometric shape of the excavator, the pressure data of the oil cylinder is configured to characterize the force state of the excavator cylinder, the dynamic data is configured to characterize the movement state of the moving parts of the excavator, and the geometric data of the excavator, the pressure data of the oil cylinder and the dynamic data all can be obtained by measuring the excavator under no-load working condition. The no-load weighing data is configured to characterize the automatic weighing results obtained based on the weighing model under the no-load working state of the excavator. The no-load weighing data in each reference data refers to the output of the weighing model obtained by inputting the geometric data of the excavator, the pressure data of the oil cylinder and the dynamic data in the reference data into the weighing model. In this embodiment of the present application, the weighing model may be a moment balance model.

In this embodiment of the present application, each reference data group in the reference data set includes both historical reference data groups and acquired real-time reference data groups. The number of historical reference data groups can be equal to the preset value. After that, each time a real-time reference data group is acquired, the real-time reference data is added to the reference data set, and the automatic weighing calibration method for the excavator provided in the embodiment of the present application is started to perform the automatic weighing calibration for the excavator.

Figure 2:
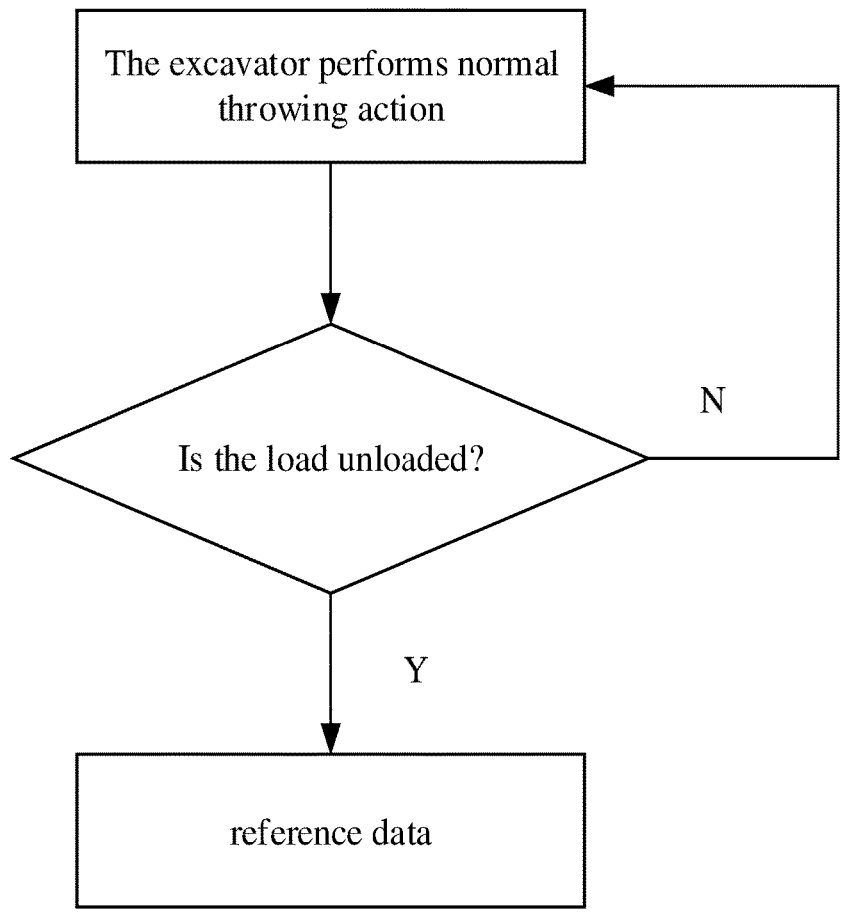
FIG. 2 is a schematic flowchart of a method for determining parameter data in the automatic weighing calibration method for the excavator according to the present application.

The acquisition method of the reference data set is shown in FIG. 2. The excavator performs normal throwing action, and then judges whether the load is unloaded. If it is unloaded, it means that the excavator is in the no-load working state. At this time, the geometric data of the excavator, the pressure data of the oil cylinder and dynamics data are obtained, and the output of the weighing model is determined. The geometric data of the excavator, the pressure data of the cylinder, the dynamics data and the output of the weighing model acted as a reference data group are added to the reference data set, and are recorded continuously until the number of reference data groups in the reference data set reaches the preset value, and the automatic weighing calibration of the excavator starts. Otherwise, if the load is not unloaded, the normal throwing action continues.

Then, step S2 is performed to calibrate the coefficient matrix of the weighing model according to the reference data set, so as to realize the automatic weighing calibration of the excavator. The coefficient matrix of the weighing model is composed of the corresponding coefficients and constant coefficients of each input in the weighing model. The weighing model is configured to automatically weigh the excavator. The weighing model is a model configured to represent the corresponding relationship between the no-load weighing data, the pressure data of the cylinder, the dynamic data, and the no-load weighing data. For example, it can be a multiple linear regression model or a machine learning model. This is not specifically limited in the embodiments of the present application.

In the embodiment of the present application, the automatic weighing calibration of the excavator is to calibrate the coefficient matrix in the weighing model, so that the weighing model with the calibrated coefficient matrix can be accurately automatically weighed. When calibrating the coefficient matrix in the weighing model, it is performed according to the reference data set. For example, regression calculation can be performed according to the reference data set, and the coefficient matrix in the weighing model can be re-determined, so as to realize the calibration of the coefficient matrix of the weighing model.

In the automatic weighing calibration method for the excavator provided in the embodiments of the present application, a reference data set of the excavator in the no-load working state is first obtained, the reference data set includes a plurality of reference data, and each reference data group includes geometric data of the excavator, pressure data of the oil cylinder, dynamic data and no-load weighing data; then based on the reference data set, the coefficient matrix of the weighing model is calibrated to realize automatic weighing calibration of the excavator; the weighing model is configured for automatic weighing of the excavator. In the process of weighing calibration, manual operation is not required, which reduces the cost of weighing calibration. Moreover, since no human error is introduced, the accuracy of weighing calibration can be improved, and the effect of weighing calibration can be improved. In addition, it has a good user experience since it does not require the user to calibrate regularly. Automatic calibration can also be performed for special situations such as the addition of bucket reinforcement plates by users.

On the basis of the above-mentioned embodiments, in the automatic weighing calibration method for the excavator provided in the embodiments of the present application, before the calibrating the coefficient matrix of the weighing model to realize the automatic weighing calibration for the excavator based on the reference data set, the method further includes:

filtering out abnormal reference data in the reference data set to obtain a normal reference data set corresponding to normal reference data.

Correspondingly, the calibrating the coefficient matrix of the weighing model to realize the automatic weighing calibration for the excavator based on the reference data set includes:

calibrating the coefficient matrix of the weighing model to realize the automatic weighing calibration for the excavator based on the normal reference data set.

Specifically, in this embodiment of the present application, after the reference data set is acquired, in order to ensure the reliability of the reference data set and the accuracy of subsequent weighing calibration, abnormal reference data in the reference data set may be filtered out. And after the abnormal reference data is filtered out, the rest is the normal reference data, that is, a normal reference data set corresponding to the normal reference data is obtained.

The filtering method may be to determine the pose information, speed information, acceleration information of each moving part of the excavator and the oil temperature information of the boom cylinder when each reference data is obtained from the reference data set, and then whether the pose information, speed information, acceleration information and oil temperature information corresponding to any reference data are all within the corresponding preset range is determined. If a certain information corresponding to any reference data is not within the corresponding preset range, it is determined that any reference data is abnormal reference data and filtered out. The movable parts of the excavator may include an upper body, a boom, an arm, a bucket, and the like. The pose information includes position information and attitude information. The attitude information can be represented by angle information or cylinder displacement. The angle information can be the angle between each movable part and the ground, or the angle between adjacent movable parts. The speed information refers to the moving speed of each movable part, and it may be the speed at which the angle information changes. The acceleration information can be the angular acceleration information between each movable part and the ground, or the angular acceleration information between adjacent movable parts. The oil temperature information may be oil temperature information of the boom cylinder.

The pose information, speed information, acceleration information, and oil temperature information can all be recorded when the corresponding reference data is obtained, so as to facilitate the filtering of abnormal reference data.

Finally, the coefficient matrix of the weighing model is calibrated according to the normal reference data set, which can further ensure the effect of automatic weighing calibration of the excavator.

On the basis of the above-mentioned embodiments, in the automatic weighing calibration method for the excavator provided in the embodiments of the present application, the calibrating the coefficient matrix of the weighing model to realize the automatic weighing calibration for the excavator based on the reference data set includes:

in response to that statistical data of the no-load weighing data in the reference data set satisfies a calibration condition, determining a calibrated coefficient matrix based on the geometric data of the excavator, the pressure data of the oil cylinder and the dynamic data in the reference data set.

Specifically, in the embodiment of the present application, when calibrating the coefficient matrix of the weighing model, it may be first determined whether the statistical data of each no-load weighing data in the reference data set satisfies the calibration conditions, and the statistical data of each no-load weighing data in the reference data set can be the minimum value, average value or other statistical indicators of all the no-load weighing data. The calibration condition may be that the statistical data is greater than a preset threshold, and the preset threshold may be set according to a calibration accuracy requirement. The smaller the preset threshold, the higher the accuracy. For example, it can be set to 50 kg.

If the statistical data of each no-load weighing data set meets the calibration conditions, the calibrated coefficient matrix is determined according to the geometric data of the excavator, pressure data of the oil cylinder and dynamic data in the reference data set of the excavator in the no-load working state. That is, the coefficient matrix of the weighing model can be set to be adjustable, and the coefficient matrix of the weighing model can be re-determined, which is the calibrated coefficient matrix.

In the embodiment of the present application, the weighing model can be trained according to the geometric data of the excavator, pressure data of the oil cylinder and dynamic data in the reference data set of the excavator under no-load working state to determine the calibrated coefficient matrix. In the training process of the weighing model, it can be judged whether the training is over by judging whether the weighing model has reached convergence. The judgment index may use one or more evaluation indexes of common regression models, such as mean absolute error, coefficient of determination, etc., which are not specifically limited in this embodiment of the present application.

If the statistical data of each no-load weighing data does not meet the calibration conditions, the calibration action will not be performed. And the no-load working state of the excavator is searched continuously, the reference data set in this state is obtained, and the pose information, speed information, acceleration information of the moving parts of the excavator at this time and the oil temperature information of the boom cylinder are recorded. After the reference data group is acquired, the reference data group is added to the reference data set, and the coefficient matrix of the weighing model is calibrated according to the reference data set, so as to realize automatic weighing calibration of the excavator.

On the basis of the above-mentioned embodiments, in the automatic weighing calibration method for the excavator provided in the embodiments of the present application, the determining the calibrated coefficient matrix based on the geometric data of the excavator, the pressure data of the oil cylinder and the dynamic data in the reference data set includes:

configuring the coefficient matrix of the weighing model as a variable matrix; and performing a regression fitting on the no-load data corresponding to the no-load working state, the geometric data of the excavator in the reference data set, the pressure data of the oil cylinder and the dynamic data to obtain the calibrated coefficient matrix based on the weighing model.

Specifically, in the embodiment of the present application, when the calibrated coefficient matrix is determined, the coefficient matrix of the weighing model may be used as the variable matrix, and the variable matrix is the unknown matrix. Then, according to the model structure of the weighing model, the no-load data corresponding to the no-load working state, the geometric data of the excavator, the pressure data of the oil cylinder and the dynamic data in the reference data set are regressed, and the coefficient matrix of the weighing model is re-determined. The re-determined coefficient matrix is the calibrated coefficient matrix.

On the basis of the above-mentioned embodiment, in the automatic weighing calibration method for the excavator provided in the embodiment of the present application, the geometric data of the excavator includes the position information and size information of each movable part of the excavator;

The position information of each movable part is determined based on the angle information of each movable part or the displacement information of the oil cylinder corresponding to each movable part.

Specifically, in the embodiment of the present application, each movable part of the excavator may include the upper body, boom, stick, and bucket of the excavator, and the geometric data of the excavator may include the size information, angle information of the upper body, boom, stick and bucket of the excavator and the displacement information of the oil cylinder, and may also include other information, which is not specifically limited in the embodiment of the present application. Among them, the position information of each movable part can be determined by the angle information of each movable part or the displacement information of the oil cylinder corresponding to each movable part, and the angle information can be the angle information relative to the ground, or the angle information between the movable parts.

On the basis of the above embodiments, in the automatic weighing calibration method for the excavator provided in the embodiments of the present application, the pressure data of the oil cylinder includes a pressure value of a large chamber of a boom hydraulic cylinder and a pressure value of a small chamber of the boom hydraulic cylinder of the excavator.

Specifically, in the embodiment of the present application, the pressure data of the oil cylinder may include the pressure value of the large chamber of the boom hydraulic cylinder of the excavator and the pressure value of the small chamber of the boom hydraulic cylinder of the excavator, and may also include other information, which is not specifically limited in the embodiment of the present application. Among them, the large chamber of the boom hydraulic cylinder refers to the rodless chamber, and the pressure value of the large chamber of the boom hydraulic cylinder refers to the pressure value in the rodless chamber; the small chamber of the boom hydraulic cylinder refers to the rod chamber, and the pressure value of the small chamber refers to the pressure value in the rod chamber.

Based on the above embodiments, in the automatic weighing calibration method for the excavator provided in the embodiments of the present application, the dynamic data includes speed information and acceleration information of each movable part of the excavator.

Specifically, in the embodiment of the present application, the dynamic data may include speed information and acceleration information of components such as the upper body, boom, stick, and bucket of the excavator. The speed information refers to the moving speed of each movable part, and it may be the speed at which the angle information changes. The acceleration information can be the angular acceleration information between each movable part and the ground, or the angular acceleration information between adjacent movable parts.

Figure 3:
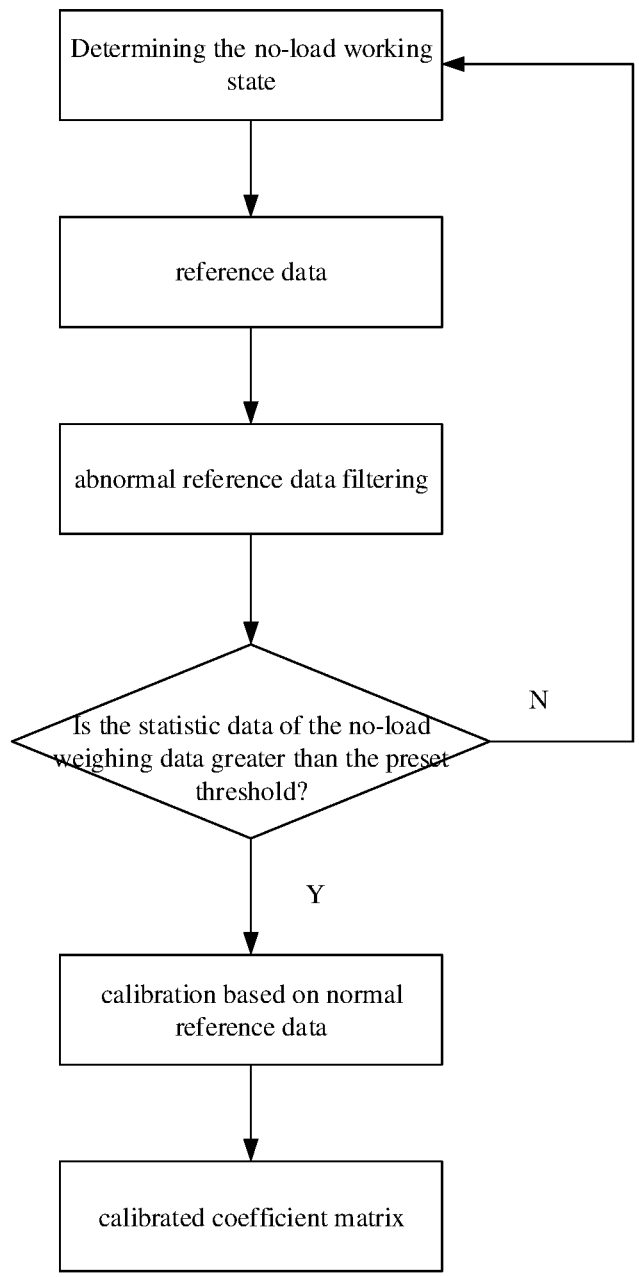
FIG. 3 is a second schematic flowchart of the automatic weighing calibration method for the excavator according to the present application.

On the basis of the above embodiment, FIG. 3 is a schematic flowchart of the automatic weighing calibration method for the excavator provided in the embodiment of the application. As shown in FIG. 3, the method includes:

1) determining the no-load working state of the excavator by judging the working state of the excavator;
2) in the no-load working state of the excavator, the internal controller of the excavator records the output of the weighing model (no-load weighing data), but does not output it to the user, and only combines the geometric data of the excavator and the pressure data of the oil cylinder as an automatic calibration reference data to store;
3) in the collection process of the reference data, filtering out the abnormal reference data, and analyzing the no-load weighing data in the normal reference data after filtering out;
4) determining whether the statistical data of the no-load weighing data in the normal reference data set is greater than the preset threshold, and if yes, executing 5), otherwise returning to 1) to continue executing.
5) calibrating the coefficient matrix of the weighing model based on the normal reference data set;
6) obtaining the calibrated coefficient matrix.

Figure 4:
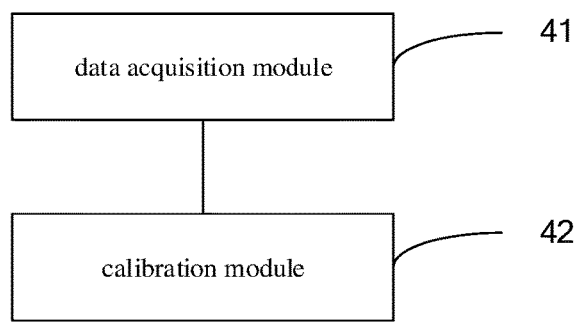
FIG. 4 is a schematic structural diagram of an automatic weighing calibration system for the excavator according to the present application.

On the basis of the above embodiment, FIG. 4 is a schematic structural diagram of the automatic weighing calibration system for the excavator provided in the embodiment of the present application. As shown in FIG. 4, the system includes: a data acquisition module 41 and a calibration module 42.

The data acquisition module 41 is configured to obtain a reference data set of the excavator under no-load working state; the reference data set includes a plurality of reference data groups, and each reference data group includes geometry data of the excavator, pressure data of an oil cylinder, dynamic data and no-load weighing data output by a weighing model; and The calibration module 42 is configured to calibrate a coefficient matrix of the weighing model to realize the automatic weighing calibration for the excavator based on the reference data set;

The weighing model is configured to automatically weigh the excavator.

On the basis of the above embodiments, the automatic weighing calibration system for the excavator provided in the embodiments of the present application further includes:

A filtering module, configured to filter out abnormal reference data in the reference data set, and obtain a normal reference data set corresponding to the normal reference data;

Accordingly, the calibration module is specifically configured for:
based on the normal reference data set, calibrating the coefficient matrix of the weighing model to realize automatic weighing calibration of the excavator.

On the basis of the above embodiments, in the automatic weighing calibration system for the excavator provided in the embodiments of the present application, the calibration module is further configured for:
if it is determined that the statistical data of the no-load weighing data in the reference data set satisfies the calibration conditions, determining a calibrated coefficient matrix based on the geometric data of the excavator, the pressure data of the oil cylinder and dynamic data in the reference data set.

On the basis of the above embodiments, in the automatic weighing calibration system for the excavator provided in the embodiments of the present application, the calibration module is further configured for:
configuring the coefficient matrix of the weighing model as a variable matrix, and based on the model structure of the weighing model, performing regression fitting for the no-load data corresponding to the no-load working state, the geometric data of the excavator, the pressure data of the oil cylinder and the dynamic data in the reference data set to obtain a calibrated coefficient matrix.

On the basis of the above embodiments, in the automatic weighing calibration system for the excavator provided in the embodiments of the present application, the geometric data of the excavator includes position information, size information and angle information of each movable part of the excavator.

On the basis of the above embodiments, in the automatic weighing calibration system for the excavator provided in the embodiments of the present application, the pressure data of the oil cylinder includes the pressure value of the large cavity of the boom hydraulic cylinder of the excavator and the pressure value of the small cavity of the boom hydraulic cylinder of the excavator.

On the basis of the above embodiments, in the automatic weighing calibration system for the excavator provided in the embodiments of the present application, the dynamic data includes speed information and acceleration information of each movable part of the excavator.

Specifically, the functions of the modules in the automatic weighing calibration system for the excavator provided in the embodiments of the present application correspond one-to-one with the operation procedures of the steps in the above method embodiments, and the achieved effects are also consistent. The embodiments of the present application are not specifically limited.

Figure 5:
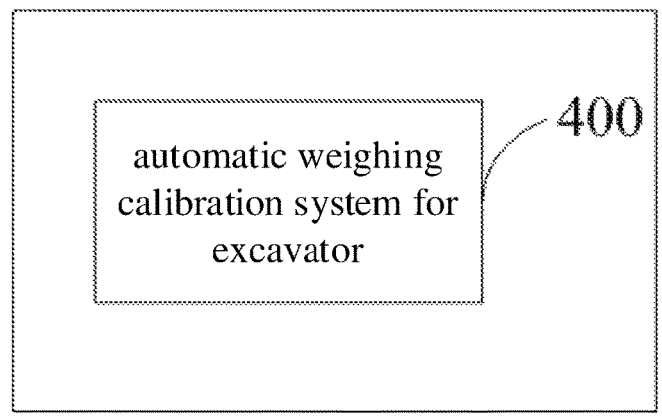
FIG. 5 is a schematic structural diagram of the excavator according to the present application.

FIG. 5 illustrates a schematic structural diagram of an excavator. As shown in FIG. 5, the excavator may include the automatic weighing calibration system 400 of the excavator described in any of the above embodiments, and the automatic weighing calibration system 400 of the excavator is configured for automatic weighing calibration of the excavator.

Figure 6:
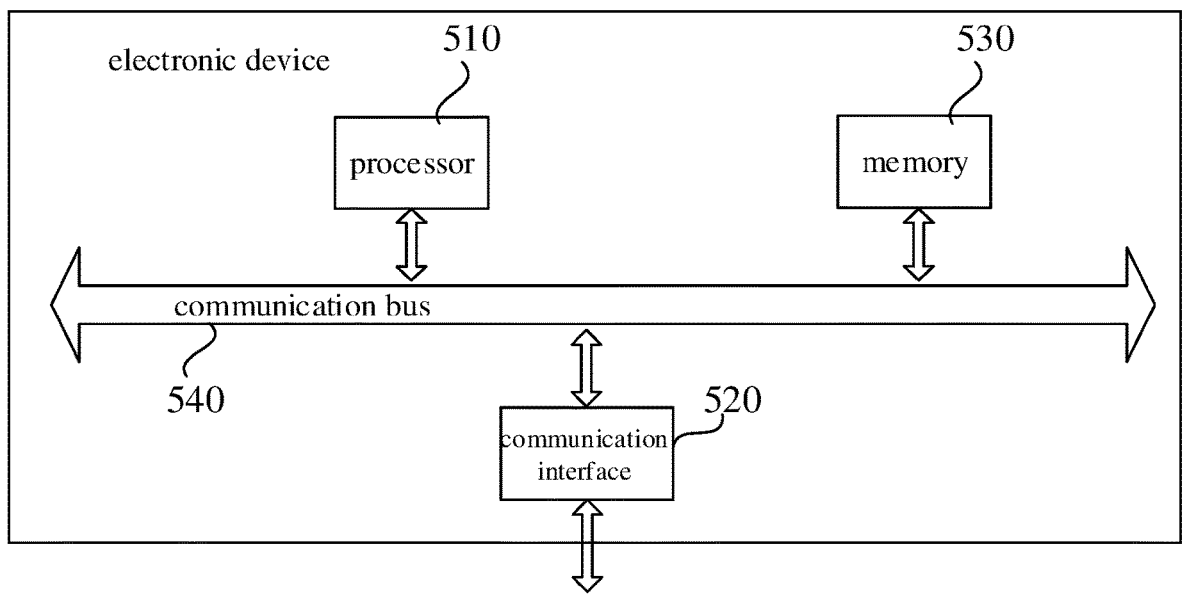
FIG. 6 is a schematic structural diagram of an electronic device according to the present application.

FIG. 6 illustrates a schematic diagram of the physical structure of an electronic device. As shown in FIG. 6, the electronic device may include: a processor 510, a communication interface 520, a memory 530 and a communication bus 540. The processor 510, the communication interface 520 and the memory 530 communicate with each other through the communication bus 540. The processor 510 can call the logic instructions in the memory 530 to execute the automatic weighing calibration method for the excavator provided in the above method embodiments. The method includes: obtaining a reference data set of the excavator under no-load working state; the reference data set includes a plurality of reference data groups, and each reference data group includes geometry data of the excavator, pressure data of an oil cylinder, dynamic data and no-load weighing data output by a weighing model; and calibrating a coefficient matrix of the weighing model to realize the automatic weighing calibration for the excavator based on the reference data set; the weighing model is configured to automatically weigh the excavator.

In addition, the above-mentioned logic instructions in the memory 530 can be implemented in the form of software functional units and can be stored in a computer-readable storage medium when sold or used as an independent product. Based on this understanding, the technical solutions of the present application can be embodied in the form of a software product in essence, or the part that contributes to the related art or the part of the technical solutions. The computer software product is stored in a storage medium, including several instructions configured to cause a computer device (which may be a personal computer, a server, or a network device, etc.) to execute all or part of the steps of the methods described in the various embodiments of the present application. The aforementioned storage medium includes: U disk, mobile hard disk, Read-Only Memory (ROM), Random Access Memory (RAM), magnetic disk or optical disk and other media that can store program codes.

In another aspect, the present application also provides a computer program product. The computer program product includes a computer program stored on a non-transitory computer-readable storage medium, and the computer program includes program instructions. When the program instructions are executed by a computer, the computer can execute the automatic weighing calibration method for the excavator provided in the above method embodiments. The method includes: obtaining a reference data set of the excavator under no-load working state; the reference data set includes a plurality of reference data groups, and each reference data group includes geometry data of the excavator, pressure data of an oil cylinder, dynamic data and no-load weighing data output by a weighing model; and calibrating a coefficient matrix of the weighing model to realize the automatic weighing calibration for the excavator based on the reference data set; the weighing model is configured to automatically weigh the excavator.

In yet another aspect, the present application also provides a non-transitory computer-readable storage medium on which a computer program is stored, and when the computer program is executed by a processor, the automatic weighing calibration method for the excavator provided in the above-mentioned method embodiments is implemented. The method includes: obtaining a reference data set of the excavator under no-load working state; the reference data set includes a plurality of reference data groups, and each reference data group includes geometry data of the excavator, pressure data of an oil cylinder, dynamic data and no-load weighing data output by a weighing model; and calibrating a coefficient matrix of the weighing model to realize the automatic weighing calibration for the excavator based on the reference data set; the weighing model is configured to automatically weigh the excavator.

The device embodiments described above are only illustrative. The units described as separate components may or may not be physically separated, and the components displayed as units may or may not be physical units, that is, they may be located in one place, or may be distributed over multiple network elements. Some or all of the modules may be selected according to actual needs to achieve the purpose of the solution in this embodiment. Those skilled in the art can understand and implement it without creative effort.

From the description of the above embodiments, those skilled in the art can clearly understand that each embodiment can be implemented by means of software plus a necessary general hardware platform, and certainly can also be implemented by hardware. Based on this understanding, the above-mentioned technical solutions can be embodied in the form of software products in essence or the parts that make contributions to the related art, and the computer software products can be stored in computer-readable storage media, such as ROM/RAM, a magnetic disc, an optical disc, etc., including several instructions for causing a computer device (which may be a personal computer, a server, or a network device, etc.) to perform the methods described in various embodiments or some parts of the embodiments.

The above embodiments are only configured to illustrate the technical solutions of the present application, but not to limit them; although the present application has been described in detail with reference to the foregoing embodiments, those skilled in the art should understand that: the technical solutions recorded in various embodiments can also be modified, or some technical features thereof can be equivalently replaced; and these modifications or replacements do not make the essence of the corresponding technical solutions deviate from the spirit and scope of the technical solutions in the embodiments of the present application.

What is claimed is:

1. An automatic weighing calibration method for an excavator, applied to an electronic device comprising a memory, a processor, and a computer program stored on the memory and running on the processor, wherein when the processor executes the computer program, the automatic weighing calibration method for the excavator is implemented, and the automatic weighing calibration method for the excavator comprises:

obtaining, by the processor, a reference data set of the excavator under a no-load working state; wherein the reference data set comprises a plurality of reference data groups, and each reference data group comprises geometry data of the excavator, pressure data of an oil cylinder, dynamic data and no-load weighing data output by a weighing model; wherein the weighing model is a multiple linear regression model or a machine learning model configured to represent the corresponding relationship between the geometry data of the excavator, the pressure data of an oil cylinder, the dynamic data and the no-load weighing data; and each reference data group in the reference data set comprises both historical reference data groups and acquired real-time reference data groups;

calibrating, by the processor, a coefficient matrix of the weighing model to realize automatic weighing calibration for the excavator based on the reference data set;

in response to that statistical data of the no-load weighing data in the reference data set satisfies a calibration condition, configuring, by the processor, the coefficient matrix of the weighing model as an unknown matrix; and performing, by the processor, a regression fitting on the no-load data corresponding to the no-load working state, the geometric data of the excavator in the reference data set, the pressure data of the oil cylinder and the dynamic data to obtain a calibrated coefficient matrix;

wherein, the weighing model is configured to automatically weigh the excavator;

wherein before the calibrating the coefficient matrix of the weighing model to realize the automatic weighing calibration for the excavator based on the reference data set, the method further comprises:

filtering out, by the processor, abnormal reference data in the reference data set to obtain a normal reference data set corresponding to normal reference data;

wherein the calibrating the coefficient matrix of the weighing model to realize the automatic weighing calibration for the excavator based on the reference data set comprises:

calibrating, by the processor, the coefficient matrix of the weighing model to realize the automatic weighing calibration for the excavator based on the normal reference data set.

2. The automatic weighing calibration method for the excavator according to claim 1, wherein the geometric data of the excavator comprises a position information and a size information of each movable part of the excavator;

the position information of each movable part is determined based on an angle information of each movable part or a displacement information of the oil cylinder corresponding to each movable part.

3. The automatic weighing calibration method for the excavator according to claim 1, wherein the pressure data of the oil cylinder comprises a pressure value of a large chamber of a boom hydraulic cylinder and a pressure value of a small chamber of the boom hydraulic cylinder of the excavator.

4. The automatic weighing calibration method for the excavator according to claim 1, wherein the dynamic data comprises a speed information and an acceleration information of each movable part of the excavator.

5. A non-transitory computer-readable storage medium on which a computer program is stored, wherein, when the computer program is executed by a processor, the steps of the automatic weighing calibration method for the excavator according to claim 1 are implemented.

* * * * *